US011275529B2

(12) United States Patent
Kulkarni et al.

(10) Patent No.: US 11,275,529 B2
(45) Date of Patent: Mar. 15, 2022

(54) MAINTENANCE MANAGEMENT ON BACKUP STORAGE SYSTEMS

(71) Applicant: EMC IP Holding Company LLC, Hopkinton, MA (US)

(72) Inventors: Gururaj Kulkarni, Bangalore (IN); Priyank Tiwari, Bangalore (IN); Michal Jacek Drozd, Cracow (PL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/987,492

(22) Filed: Aug. 7, 2020

(65) Prior Publication Data

US 2022/0043599 A1 Feb. 10, 2022

(51) Int. Cl.
*G06F 3/06* (2006.01)

(52) U.S. Cl.
CPC .......... *G06F 3/0659* (2013.01); *G06F 3/065* (2013.01); *G06F 3/0619* (2013.01); *G06F 3/0683* (2013.01)

(58) Field of Classification Search
CPC ...... G06F 3/0659; G06F 3/0619; G06F 3/065; G06F 3/0683
See application file for complete search history.

(56) References Cited

U.S. PATENT DOCUMENTS

| 6,593,930 | B1 * | 7/2003 | Sheaffer | G09G 5/18 345/213 |
| 9,569,352 | B2 * | 2/2017 | Marcu | G06F 12/0238 |
| 10,838,853 | B1 * | 11/2020 | Kuzmin | G06F 12/0246 |
| 2002/0152305 | A1 * | 10/2002 | Jackson | H04L 41/509 709/224 |
| 2020/0201698 | A1 * | 6/2020 | Gans | G11C 11/2257 |
| 2021/0109855 | A1 * | 4/2021 | Watt | G06F 9/5011 |

\* cited by examiner

*Primary Examiner* — Eric Cardwell
(74) *Attorney, Agent, or Firm* — Chamberlain, Hrdlicka, White, Williams & Aughtry

(57) ABSTRACT

Maintenance management on backup storage systems. Specifically, the disclosed method and system derive backup storage system load from a collection of profiled load factoring features. The backup storage system load may subsequently drive whether maintenance operations may be deferred to projected non-peak load times or, alternatively, may be permitted to proceed.

20 Claims, 4 Drawing Sheets

MAINTENANCE MANAGEMENT ON BACKUP STORAGE SYSTEMS

BACKGROUND

Maintenance operations are often scheduled at fixed periodicities based on user or administrator configurations. Though, ideally, these fixed periodicities are meant to coincide with system idle times, more often than not, the scheduled occurrence of maintenance operations still overlap with the execution of other, more-critical operations, thereby burdening system resources.

SUMMARY

In general, in one aspect, the invention relates to a method for maintenance management. The method includes detecting a first trigger for a first maintenance operation, in response to detecting the first trigger for the first maintenance operation, profiling, for a first point-in-time, a plurality of load factoring features, computing a first current load factor using the plurality of load factoring features for the first point-in-time, making a first determination that the first current load factor at least meets a permissible load factor, and deferring, based on the first determination, the first maintenance operation to a later point-in-time.

In general, in one aspect, the invention relates to a non-transitory computer readable medium (CRM). The non-transitory CRM includes computer readable program code, which when executed by a computer processor, enables the computer processor to detect a first trigger for a first maintenance operation, in response to detecting the first trigger for the first maintenance operation, profile, for a first point-in-time, a plurality of load factoring features, compute a first current load factor using the plurality of load factoring features for the first point-in-time, make a first determination that the first current load factor at least meets a permissible load factor, and defer, based on the first determination, the first maintenance operation to a later point-in-time.

In general, in one aspect, the invention relates to a backup storage system. The backup storage system includes a storage array, and a computer processor operatively connected to the storage array, and programmed to detect a first trigger for a first maintenance operation, in response to detecting the first trigger for the first maintenance operation, profile, for a first point-in-time, a plurality of load factoring features, compute a first current load factor using the plurality of load factoring features for the first point-in-time, make a first determination that the first current load factor at least meets a permissible load factor, and defer, based on the first determination, the first maintenance operation to a later point-in-time.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to maintenance management on backup storage systems. Specifically, one or more embodiments of the invention derive backup storage system load from a collection of profiled load factoring features. The backup storage system load may subsequently drive whether maintenance operations may be deferred to projected non-peak load times or, alternatively, may be permitted to proceed.

Figure 1:
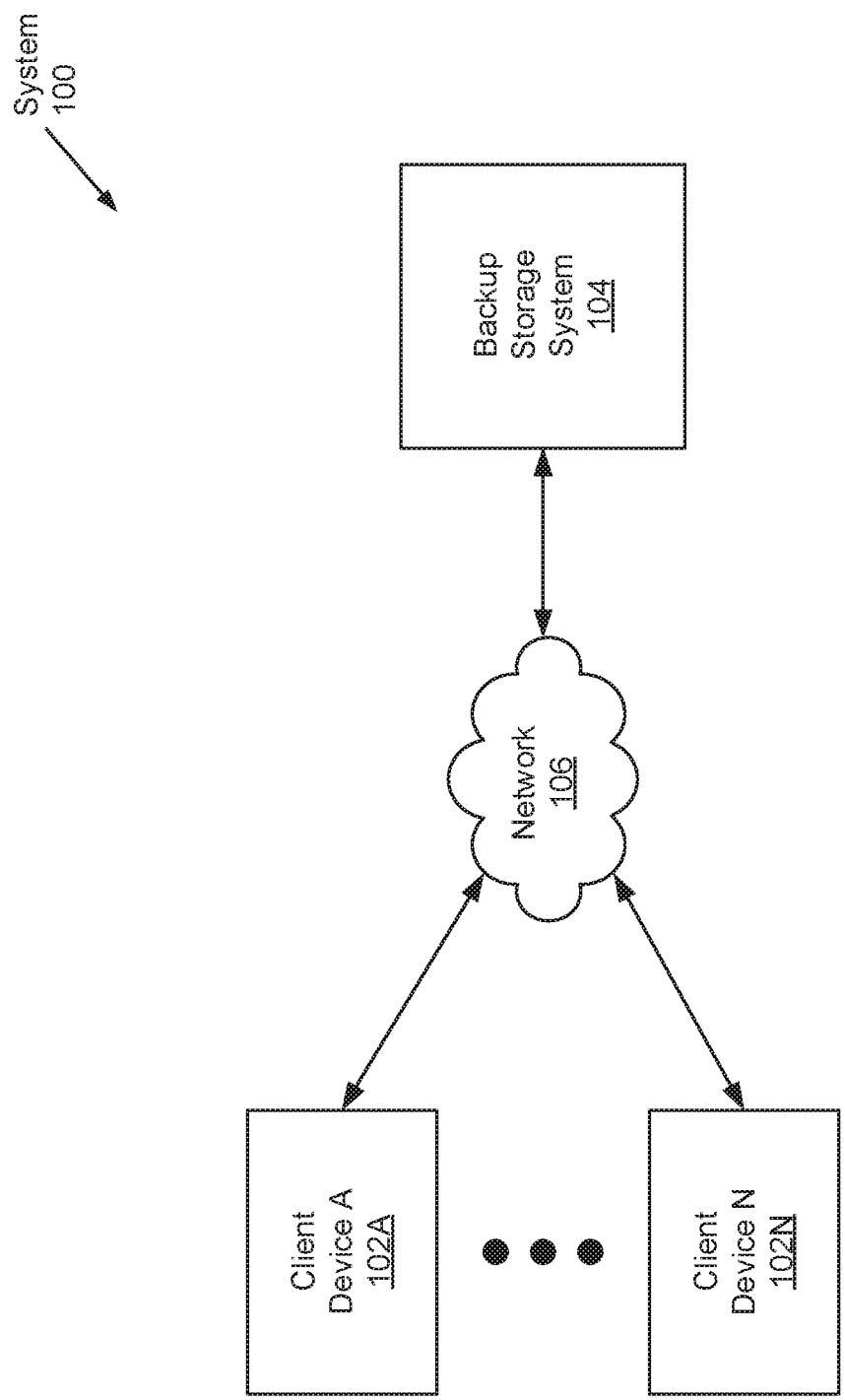
FIG. 1 shows a system in accordance with one or more embodiments of the invention.

FIG. 1 shows a system in accordance with one or more embodiments of the invention. The system (100) may include one or more client devices (102A-102N) operatively connected to a backup storage system (104) through a network (106). Each of these system (100) components is described below.

In one embodiment of the invention, a client device (102A-102N) may represent any physical appliance or computing system configured to receive, generate, process, store, and/or transmit data, as well as to provide an environment in which one or more computer programs may execute thereon. The computer programs (not shown) may, for example, implement large-scale and complex data processing; or implement one or more services offered locally or over the network (106). Further, in providing an execution environment for any computer program installed thereon, a client device (102A-102N) may include and allocate various resources (e.g., computer processors, memory, storage, virtualization, network bandwidth, etc.), as needed, to the computer program(s) and the tasks (or processes) instantiated thereby. A client device (102A-102N) may be further configured to interact with the backup storage system (104) for data backup, archiving, and/or disaster recovery purposes. One of ordinary skill will appreciate that a client device (102A-102N) may perform other functionalities without departing from the scope of the invention. Examples of a client device (102A-102N) may include, but are not limited to, a desktop computer, a laptop computer, a workstation computer, a server, a mainframe, or any other computing system similar to the exemplary computer system shown in FIG. 4.

In one embodiment of the invention, the backup storage system (104) may represent a data backup, archiving, and/or disaster recovery platform, which may service the client device(s) (102A-102N). The backup storage system (104) may be implemented using one or more servers (not shown). Each server may represent a physical or virtual server, which may reside in a datacenter or a cloud computing environment. Additionally or alternatively, the backup storage system (104) may be implemented using one or more computing systems similar to the exemplary computing system shown in FIG. 4. The backup storage system (104) is described in further detail below with respect to FIG. 2.

In one embodiment of the invention, the above-mentioned system (100) components may operatively connect to one another through the network (106) (e.g., a local area network (LAN), a wide area network (WAN) such as the Internet, a mobile network, any other network type, or a combination thereof). The network (106) may be implemented using any combination of wired and/or wireless connections. Further, the network (106) may encompass various interconnected, network-enabled subcomponents (or systems) (not shown) (e.g., switches, routers, gateways, etc.) that may facilitate communications between the above-mentioned system (100) components. Moreover, the above-mentioned system (100) may communicate with one another using any combination of wired and/or wireless communication protocols.

While FIG. 1 shows a configuration of components, other system (100) configurations may be used without departing from the scope of the invention.

Figure 2:
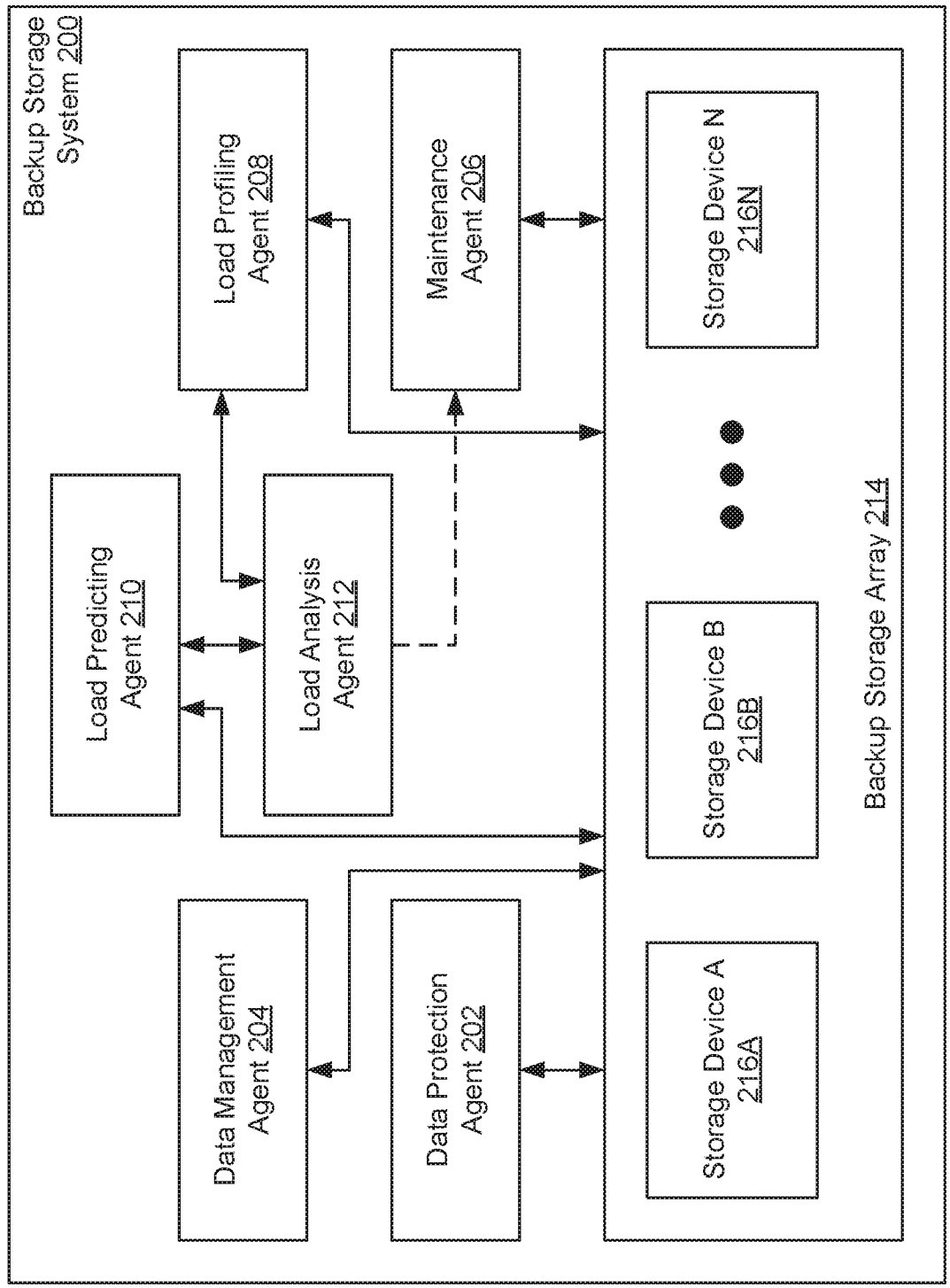
FIG. 2 shows a backup storage system in accordance with one or more embodiments of the invention.

FIG. 2 shows a backup storage system in accordance with one or more embodiments of the invention. The backup storage system (200) may include a data protection agent (202), a data management agent (204), a maintenance agent (206), a load profiling agent (208), a load predicting agent (210), a load analysis agent (212), and a backup storage array (214). Each of these backup storage system (200) subcomponents is described below.

In one embodiment of the invention, the data protection agent (202) may refer to a computer program that may execute on the underlying hardware of the backup storage system (200). Specifically, the data protection agent (202) may be responsible for data backup operations. To that extent, the data protection agent (202) may include functionality to: receive data from one or more client devices (not shown), where the received data may have been submitted for data backup, archiving, and/or disaster recovery purposes; and store the received data on the backup storage array (214). One of ordinary skill will appreciate that the data protection agent (202) may perform other functionalities without departing from the scope of the invention.

In one embodiment of the invention, the data management agent (204) may refer to a computer program that may execute on the underlying hardware of the backup storage system (200). Specifically, the data management agent (204) may be responsible for data cloning and/or recovery operations. To that extent, the data management agent (204) may include functionality to: retrieve data stored on the backup storage array (214); and clone or recover the obtained data onto one or more client devices (not shown). One of ordinary skill will appreciate that the data management agent (204) may perform other functionalities without departing from the scope of the invention.

In one embodiment of the invention, the maintenance agent (206) may refer to a computer program that may execute on the underlying hardware of the backup storage system (200). Specifically, the maintenance agent (206) may be responsible for maintenance operations. To that extent, the maintenance agent (206) may include functionality to: purge expired data—i.e., data associated with expired retention times—from the backup storage array (214); purge expired jobs or processes—e.g., data backup, data management, maintenance, load profiling, load predicting, load analysis, etc. jobs/processes—which have been completed or have crossed their default retention times; generate snapshots of data (or compress data) stored on the backup storage array (214) to reduce storage space consumption; probe the expired data periodically; and catalog any backup data. One of ordinary skill will appreciate that the maintenance agent (206) may perform other functionalities without departing from the scope of the invention.

In one embodiment of the invention, the load profiling agent (208) may refer to a computer program that may execute on the underlying hardware of the backup storage system (200). Specifically, the load profiling agent (208) may be responsible for profiling various load factoring features (described below). To that extent, the load profiling agent (208) may include functionality to: collect the various load factoring features periodically, or over varying time intervals; maintain the collected load factoring features on the backup storage array (214) for historical trend analysis; and/or provide the collected load factoring features to the load analysis agent (212) for processing. One of ordinary skill will appreciate that the load profiling agent (208) may perform other functionalities without departing from the scope of the invention.

In one embodiment of the invention, a load factoring feature may represent a measurable property, or a metric derived therefrom, which may, in part, contribute to the overall system load imposed on the backup storage system (200) at any given point-in-time. Further, a load factoring feature may reflect a quantitative (e.g., numerical) or qualitative (e.g., categorical, ordinal, text, etc.) value. Moreover, each load factoring feature may be associated with a given factor type—i.e., an application factor type, an operating system (OS) factor type, and an infrastructure factor type. Each of these factor types is described below.

In one embodiment of the invention, load factoring features of the application factor type may relate to the user-level process layer of the backup storage system (200). Examples of these application-type load factoring features may include, but are not limited to: a number of client devices (or users thereof) being serviced; a number of queued data protection and/or data management jobs; an amount of storage space consumed by client device data per a given time interval (e.g., per day, per week, per month, etc.); a number of started data protection and/or data management jobs; a number of operations concurrently executing; and types (e.g., data backup, data cloning, data recovery, etc.) of the operations concurrently executing (if any). One of ordinary skill will appreciate that application-type load factoring features are not limited to the aforementioned examples.

In one embodiment of the invention, load factoring features of the OS factor type may relate to the kernel layer of the backup storage system (200). Examples of these OS-type load factoring features may include, but are not limited to: one or more pre-specified per-client device (or per-user) resource limits—i.e., settings for regulating the usage of backup storage system (200) resources on a per-client device (or per-user) basis; one or more heap settings for physical and/or virtual memory allocation; one or more transport control protocol (TCP) settings for networking; one or more input-output (TO) settings for disk accessing; and utilization metrics for various backup storage system (200) resources (e.g., computer processors, memory, storage, virtualization, network bandwidth, etc.). One of ordinary skill will appreciate that the OS-type load factoring features are not limited to the aforementioned examples.

In one embodiment of the invention, load factoring features of the infrastructure factor type may relate to the hardware layer of the backup storage system (200). Examples of these infrastructure-type load factoring features may include, but are not limited to: whether the backup storage system (200) is hosted on bare-metal servers or within a virtual machine; a host bus adapter (HBA) employed by the backup storage system (200); a network card used by the backup storage system (200); a number of computer processors installed on the backup storage system (200); a number of storage devices (and capacities thereof) installed on the backup storage system (200); and an overall memory capacity available on the backup storage system (200). One of ordinary skill will appreciate that the infrastructure-type load factoring features are not limited to the aforementioned examples.

In one embodiment of the invention, the load predicting agent (210) may refer to a computer program that may execute on the underlying hardware of the backup storage system (200). Specifically, the load predicting agent (210) may be responsible for load forecasting. To that extent, the load predicting agent (210) may include functionality to: retrieve historical and current load factoring features and/or load factors maintained on the backup storage array (214); generate load prediction models based on the retrieved historical/current load factoring features and/or load factors; identify one or more future non-peak load times—i.e., projected time intervals when one or more data protection (i.e., backup) and/or data management (i.e., cloning, recovery) operations is/are not expected to be performed—using the generated prediction models; and provide the identified future non-peak load time(s) to the load analysis agent (212). The aforementioned load prediction model(s) may employ regression statistical analysis, machine learning, or any other algorithm or method used in data forecasting. One of ordinary skill will appreciate that the load predicting agent (210) may perform other functionalities without departing from the scope of the invention.

In one embodiment of the invention, the load analysis agent (212) may refer to a computer program that may execute on the underlying hardware of the backup storage system (200). Specifically, the load analysis agent (212) may be responsible for load factor computation and maintenance operation control. To that extent, the load analysis agent (212) may include functionality to: detect triggers for maintenance operations; invoke the load profiling agent (208) and load predicting agent (210) to perform their respective functions (described above) in response to the detected maintenance operation triggers; obtain collected load factoring features from the load profiling agent (208); compute current load factors (described below) using the obtained load factoring features; invoke the maintenance agent (206) to perform the maintenance operations should the computed current load factors fall below a permissible load factor; obtain predicted non-peak load times from the load predicting agent (210); defer the maintenance operations to a non-peak load time selected from amongst the predicted non-peak load times should the computed current load factors at least meet the permissible load factor; and track a number of deferments performed for the various queued maintenance operations. One of ordinary skill will appreciate that the load analysis agent (212) may perform other functionalities without departing from the scope of the invention.

In one embodiment of the invention, a current load factor may refer to a ratio or percentage of overall backup storage system (200) resources (e.g., computer processors, memory, storage, virtualization, network bandwidth, etc.) being provisioned and consumed at a current point-in-time. By way of examples, a current load factor and the constituent arguments thereof may be calculated based on the following pseudo-formulas (note: Fn[ ] denotes "function of"):

Current Load Factor=Fn[Application Load Factor, OS Load Factor, Infrastructure Load Factor ]

Application Load Factor=Fn[Job Startup Time, Number of Jobs, Maximum No. of Concurrent Jobs, Maximum No. of Concurrent Operations ]

OS Load Factor=Fn[Memory Utilization, Computer Processor Utilization, No. of Input-Output Operations per Second (IOPS) ]

Infrastructure Load Factor=Fn[Computer Processor Type, No. of Computer Processors, Network Card Type, No. of Network Cards, Host Bus Adapter (HBA) type, Memory Type ]

In one embodiment of the invention, the backup storage array (214) may refer to a collection of one or more physical storage devices (216A-216N) on which various forms of data may be consolidated. Data stored therein may include, but is not limited to: a collection of historical and current load factoring features (described above); a collection of historical and current computed load factors (described above); and any protected client device data from one or more client devices. The physical storage device(s) (216A-216N) may store other information without departing from the scope of the invention.

Further, in one embodiment of the invention, each physical storage device (216A-216N) may encompass non-transitory computer readable storage media on which data may be stored in whole or in part, and temporarily or permanently. In addition, each physical storage device (216A-216N) may be implemented using any or a combination of storage device technologies—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the backup storage array (214) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

While FIG. 2 shows a configuration of subcomponents, other backup storage system (200) configurations may be used without departing from the scope of the invention.

Figure 3:
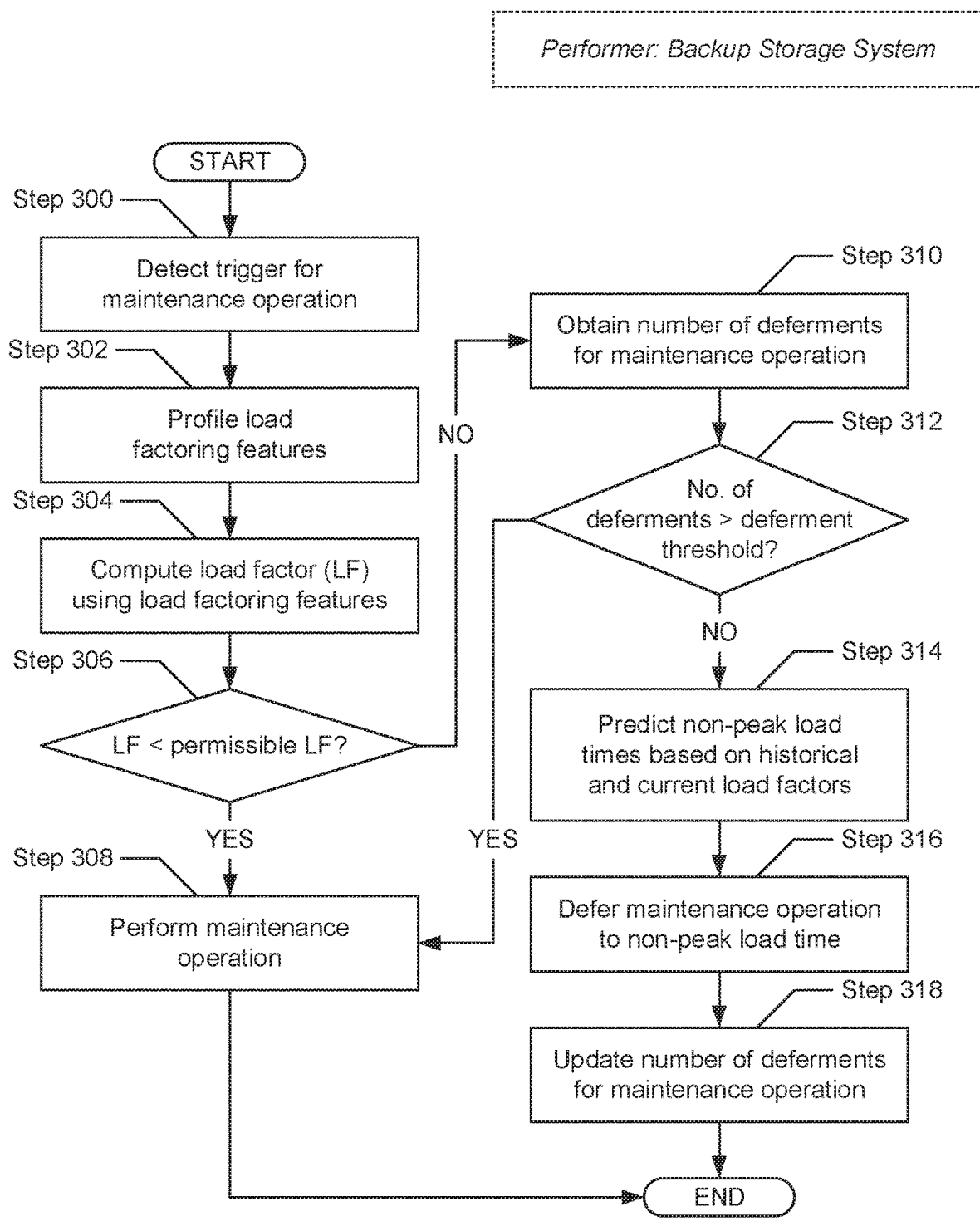
FIG. 3 shows a flowchart describing a method for maintenance management on backup storage systems in accordance with one or more embodiments of the invention.

FIG. 3 shows a flowchart describing a method for maintenance management on backup storage systems in accordance with one or more embodiments of the invention. The various steps outlined below may be performed by the backup storage system (see e.g., FIGS. 1 and 2). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, a trigger for a maintenance operation is detected. In one embodiment of the invention, the maintenance operation be directed to purging expired data, purging completed or expired jobs and processes, generating snapshots of data (or compressing data) to reduce storage space consumption, probing the expired data periodically, cataloging any backup data, or any other maintenance activity pertinent to the backup storage system. Further, the trigger for the maintenance operation may manifest, for example, as an initialization of the backup storage system, a time slot during which the maintenance operation had been scheduled, or any other event or met criterion instigating the maintenance operation.

In Step 302, in response to the trigger for the maintenance operation (detected in Step 300), various load factoring features are profiled. In one embodiment of the invention, each load factoring feature may represent a measurable property, or a metric derived therefrom, which may, in part, contribute to the overall system load imposed on the backup storage system at any given point-in-time. Examples of these various load factoring features may include, but are not limited to:

In Step 304, a current load factor is computed using the various load factoring features (profiled in Step 302). In one embodiment of the invention, the current load factor may refer to a ratio or percentage of overall backup storage system resources (e.g., computer processors, memory, storage, virtualization, network bandwidth, etc.) being provisioned and consumed at a current point-in-time.

In Step 306, a determination is made as to whether the current load factor (computed in Step 304) at least meets or satisfies a permissible load factor. The permissible load factor may represent a pre-specified load factor value indicative of a maximum load factor allowed on the backup storage system at any given point-in-time. Further, the permissible load factor may be decided based on pre-specified weightage. Accordingly, in one embodiment of the invention, if it is determined that the current load factor falls short of the permissible load factor, then the process proceeds to Step 308. On the other hand, in another embodiment of the invention, if it is alternatively determined that the current load factor at least meets or satisfies the permissible load factor, then the process alternatively proceeds to Step 310.

In Step 308, following the determination (in Step 306) that the current load factor (computed in Step 304) does not at least meet or satisfy a permissible load factor, the maintenance operation (for which a trigger had been detected in Step 300) is performed.

In Step 310, following the alternative determination (in Step 306) that the current load factor (computed in Step 304) at least meets or satisfies a permissible load factor, a number of deferments tracked for the maintenance operation (for which a trigger had been detected in Step 300) is obtained. In one embodiment of the invention, the number of deferments may refer to a counter or numerical variable, which may reflect a number of times the maintenance operation has been postponed or rescheduled for a later point-in-time (or time slot).

In Step 312, a determination is made as to whether the number of deferments for the maintenance operation (obtained in Step 310) exceeds a deferment threshold. The deferment threshold may represent a pre-specified deferment value indicative of a maximum number of deferments, for any given maintenance operation, permitted at any given point-in-time until the maintenance operation must be enforced. Accordingly, in one embodiment of the invention, if it is determined that the number of deferments for the maintenance operation does not exceed the deferment threshold, then the process proceeds to Step 314. On the other hand, in another embodiment of the invention, if it is alternatively determined that the number of deferments for the maintenance operation exceeds the deferment threshold, then the process alternatively proceeds to Step 308, where the maintenance operation is performed.

In Step 314, following the determination (in Step 312) that the number of deferments for the maintenance operation (obtained in Step 310) does not exceed a deferment threshold, one or more future non-peak load times is/are predicted. In one embodiment of the invention, each predicted non-peak load time may refer to a later point-in-time when any data protection and/or data management operations are not expected to be performed. Further, the predicted non-peak load time(s) may be identified using load prediction models generated based on maintained historical load factors and the current load factor (computed in Step 304).

In Step 316, performance of the maintenance operation (for which a trigger had been detected in Step 300) is deferred to a non-peak load time selected from the non-peak load time(s) (predicted in Step 314). Thereafter, in Step 318, the number of deferments for the maintenance operation (obtained in Step 310) is updated, or more specifically, incremented.

Figure 4:
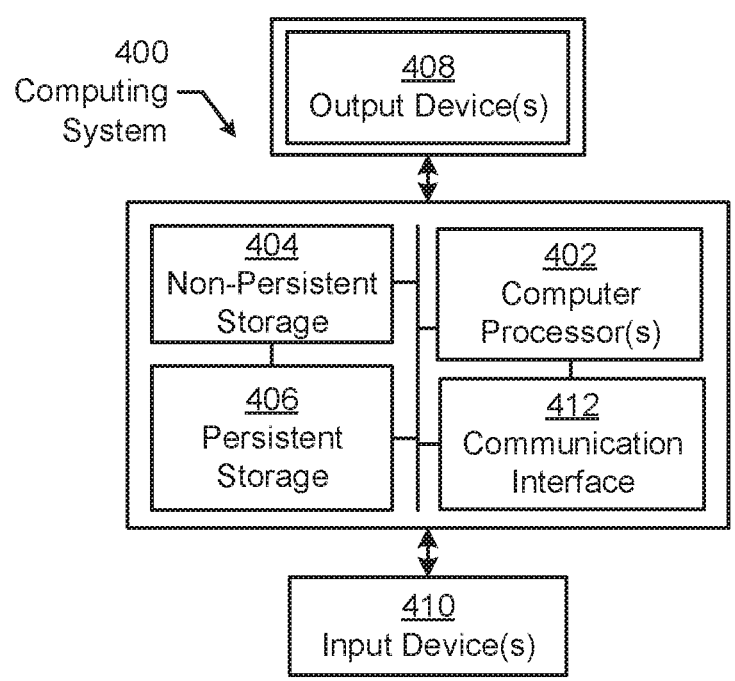
FIG. 4 shows an exemplary computing system in accordance with one or more embodiments of the invention.

FIG. 4 shows an exemplary computing system in accordance with one or more embodiments of the invention. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (6412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one embodiment of the invention, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for maintenance management, comprising:
   detecting a trigger for a first maintenance operation;
   in response to detecting the trigger for the first maintenance operation:
      profiling, for a first point-in-time, a plurality of load factoring features;
      computing a first current load factor using the plurality of load factoring features for the first point-in-time;
      making a first determination that the first current load factor at least meets a permissible load factor;
      making a second determination that a number of deferments for the first maintenance operation exceeds a deferment threshold; and
      performing, based on the first and second determinations, the first maintenance operation.

2. The method of claim 1, wherein the first maintenance operation performs one selected from a group consisting of purging expired data, purging expired jobs, and compressing stored data.

3. The method of claim 1, wherein the plurality of load factoring features comprises at least one application-type load factoring feature, at least one operating system (OS)-type load factoring feature, and at least one infrastructure-type load factoring feature.

4. The method of claim 1, further comprising:
   detecting a trigger for a second maintenance operation;
   in response to detecting the trigger for the second maintenance operation:
      profiling, for a second point-in-time, the plurality of load factoring features;
      computing a second current load factor using the plurality of load factoring features for the second point-in-time;
      making a third determination that the second current load factor is below the permissible load factor; and
      performing, based on the third determination, the second maintenance operation.

5. The method of claim 1, further comprising:
   detecting a trigger for a second maintenance operation;
   in response to detecting the trigger for the second maintenance operation:
      profiling, for a second point-in-time, the plurality of load factoring features;
      computing a second current load factor using the plurality of load factoring features for the second point-in-time;
      making a third determination that the second current load factor at least meets the permissible load factor; and
      deferring, based on the third determination, the second maintenance operation to a later point-in-time.

6. The method of claim 5, wherein the later point-in-time comprises a non-peak load time when at least one selected from a group consisting of a data backup operation, a data cloning operation, and a data recovery operation, is not expected to be performed.

7. The method of claim 6, further comprising:
   prior to deferring the second maintenance operation:
      predicting a plurality of non-peak load times based on a plurality of historical load factors and the second current load factor,
      wherein the plurality of non-peak load times comprises the non-peak load time.

8. The method of claim 7, further comprising:
   prior to predicting the plurality of non-peak load times:
      obtaining a second number of deferments for the second maintenance operation; and
      making a fourth determination that the second number of deferments does not exceed the deferment threshold,
      wherein deferring the second maintenance operation to the later point-in-time is further based on the fourth determination.

9. A non-transitory computer readable medium (CRM) comprising computer readable program code, which when executed by a computer processor, enables the computer processor to:
   detect a trigger for a first maintenance operation;
   in response to detecting the trigger for the first maintenance operation:
      profile, for a first point-in-time, a plurality of load factoring features;
      compute a first current load factor using the plurality of load factoring features for the first point-in-time;
      make a first determination that the first current load factor at least meets a permissible load factor;
      make a second determination that a number of deferments for the first maintenance operation exceeds a deferment threshold; and
      perform, based on the first and second determinations, the first maintenance operation.

10. The non-transitory CRM of claim 9, wherein the first maintenance operation performs one selected from a group consisting of purging expired data, purging expired jobs, and compressing stored data.

11. The non-transitory CRM of claim 9, wherein the plurality of load factoring features comprises at least one application-type load factoring feature, at least one operating system (OS)-type load factoring feature, and at least one infrastructure-type load factoring feature.

12. The non-transitory CRM of claim 9, comprising computer readable program code, which when executed by the computer processor, further enables the computer processor to:
   detect a trigger for a second maintenance operation;

in response to detecting the trigger for the second maintenance operation:
profile, for a second point-in-time, the plurality of load factoring features;
compute a second current load factor using the plurality of load factoring features for the second point-in-time;
make a third determination that the second current load factor is below the permissible load factor; and
perform, based on the third determination, the second maintenance operation.

13. The non-transitory CRM of claim 9, comprising computer readable program code, which when executed by the computer processor, further enables the computer processor to:
detect a trigger for a second maintenance operation;
in response to detecting the trigger for the second maintenance operation:
profile, for a second point-in-time, the plurality of load factoring features;
compute a second current load factor using the plurality of load factoring features for the second point-in-time;
make a third determination that the second current load factor at least meets the permissible load factor; and
defer, based on the third determination, the second maintenance operation to a later point-in-time.

14. The non-transitory CRM of claim 13, wherein the later point-in-time comprises a non-peak load time when at least one selected from a group consisting of a data backup operation, a data cloning operation, and a data recovery operation, is not expected to be performed.

15. The non-transitory CRM of claim 14, comprising computer readable program code, which when executed by the computer processor, further enables the computer processor to:
prior to deferring the second maintenance operation:
predict a plurality of non-peak load times based on a plurality of historical load factors and the second current load factor,
wherein the plurality of non-peak load times comprises the non-peak load time.

16. The non-transitory CRM of claim 15, comprising computer readable program code, which when executed by the computer processor, further enables the computer processor to:
prior to predicting the plurality of non-peak load times:
obtain a second number of deferments for the second maintenance operation; and
make a fourth determination that the second number of deferments does not exceed the deferment threshold,
wherein deferring the second maintenance operation to the later point-in-time is further based on the fourth determination.

17. A backup storage system, comprising:
a storage array; and
a computer processor operatively connected to the storage array, and programmed to:
detect a trigger for a first maintenance operation;
in response to detecting the trigger for the first maintenance operation:
profile, for a first point-in-time, a plurality of load factoring features;
compute a first current load factor using the plurality of load factoring features for the first point-in-time;
make a first determination that the first current load factor at least meets a permissible load factor;
make a second determination that a number of deferments for the first maintenance operation exceeds a deferment threshold; and
perform, based on the first and second determinations, the first maintenance operation.

18. The backup storage system of claim 17, wherein the first maintenance operation performs one selected from a group consisting of purging expired data, purging expired jobs, and compressing stored data.

19. The backup storage system of claim 17, wherein the plurality of load factoring features comprises at least one application-type load factoring feature, at least one operating system (OS)-type load factoring feature, and at least one infrastructure-type load factoring feature.

20. The backup storage system of claim 17, wherein the computer processor is further programmed to:
detect a trigger for a second maintenance operation;
in response to detecting the trigger for the second maintenance operation:
profile, for a second point-in-time, the plurality of load factoring features;
compute a second current load factor using the plurality of load factoring features for the second point-in-time;
make a third determination that the second current load factor at least meets the permissible load factor; and
defer, based on the third determination, the second maintenance operation to a later point-in-time.

* * * * *